US006423282B1

(12) United States Patent
Araki et al.

(10) Patent No.: US 6,423,282 B1
(45) Date of Patent: Jul. 23, 2002

(54) METHOD FOR THE REGENERATION OF AN ACID GAS ABSORBING FLUID CONTAINING METHYDIETHANOLAMINE AND A (LOWER ALKYL) PIPERAZINE

(75) Inventors: Ryosuke Araki, Kawasaki; Masaki Iijima, Tokyo; Shigeaki Mitsuoka; Hiroshi Tanaka, both of Hiroshima, all of (JP)

(73) Assignees: Nippon Nyukazai Co., Ltd.; Mitsubishi Heavy Industries, Ltd., both of Tokyo (JP)

( * ) Notice: Subject to any disclaimer, the term of this patent is extended or adjusted under 35 U.S.C. 154(b) by 0 days.

(21) Appl. No.: 09/445,246

(22) PCT Filed: Apr. 1, 1999

(86) PCT No.: PCT/JP99/01721

§ 371 (c)(1),
(2), (4) Date: Dec. 3, 1999

(87) PCT Pub. No.: WO99/51326

PCT Pub. Date: Oct. 14, 1999

(30) Foreign Application Priority Data

Apr. 6, 1998 (JP) .............................................. 10-092978

(51) Int. Cl.[7] .......................... B01D 53/40; B01D 53/62
(52) U.S. Cl. ..................... 423/210; 423/228; 423/229
(58) Field of Search ................................ 423/228, 229, 423/210

(56) References Cited

U.S. PATENT DOCUMENTS

| 4,094,957 | A | | 6/1978 | Sartori et al. ............... 423/223 |
|---|---|---|---|---|
| 4,336,233 | A | * | 6/1982 | Appl et al. .................. 423/228 |
| 5,017,350 | A | | 5/1991 | Hakka et al. ................ 423/243 |
| 5,019,361 | A | * | 5/1991 | Hakka ........................ 423/243 |
| 5,209,914 | A | | 5/1993 | Peytavy et al. ............. 423/228 |
| 5,618,506 | A | | 4/1997 | Suzuki et al. ............... 423/228 |
| 5,904,908 | A | * | 5/1999 | Suzuki et al. ............... 423/228 |
| 6,337,059 | B1 | * | 1/2002 | Schubert et al. ............ 423/210 |

FOREIGN PATENT DOCUMENTS

| JP | 53-81490 | 7/1978 | ........... B01D/53/16 |
|---|---|---|---|
| JP | 2-258012 A | 10/1990 | ........... B01D/53/34 |
| JP | 2-504367 A | 12/1990 | ........... B01D/53/14 |
| JP | 06198120 A | 7/1994 | ........... B01D/53/14 |
| JP | 8-252430 A | 10/1996 | ........... B01D/53/62 |

OTHER PUBLICATIONS

Copy of Derwent Abstract for JP 6–198120A, Jul. 1994.*
International Search Report for Corresponding International Application No. PCT/JP99/01721.

* cited by examiner

Primary Examiner—Steven P. Griffin
Assistant Examiner—Timothy C. Vanoy
(74) Attorney, Agent, or Firm—Myers Bigel Sibley & Sajovec, P.A.

(57) ABSTRACT

A method for the regeneration of an acid gas absorbing fluid which comprises bringing a gaseous mixture containing an acid gas such as, for example, gasified coal gas, synthesis gas, coke oven gas, petroleum gas, natural gas, and the like, into contact with an absorbing fluid containing methyldiethanolamine and a (lower alkyl)piperizine such as, for example, 2-methylpiperazine or 2,5-dimethylpiperazine, so as to absorb the acid gas into the absorbing fluid, and regenerating the absorbing fluid by releasing the acid gas from the absorbing fluid by releasing the acid gas from the absorbing fluid in a regeneration tower having a temperature of not less than 40° C., preferably from 40° C. to 80° C.

3 Claims, 9 Drawing Sheets

Vapor Pressure of Each Absorbing Fluid

Relationship between $CO_2$ Partial Pressure and Solubility

Relationship between $CO_2$ Partial Pressure and Solubility

Relationship between Regeneration Tower Temperature and $CO_2$ Loading Difference Relationship between Regeneration Tower Temperature and $CO_2$ Recovery $K_{Ga}$: Gas-based overall capacity coefficient
(kg mol/m³·h·atm)

Changes of Heat-stable Salt Concentration with Time

US 6,423,282 B1

METHOD FOR THE REGENERATION OF AN ACID GAS ABSORBING FLUID CONTAINING METHYDIETHANOLAMINE AND A (LOWER ALKYL) PIPERAZINE

FIELD OF THE INVENTION

This invention relates to a method for regenerating an acid gas absorbing fluid effectively by allowing the acid gas absorbing fluid to absorb an acid gas and thereafter releasing the acid gas therefrom.

BACKGROUND ART

Conventionally, there have been proposed a variety of absorbents for removing an acid gas (e.g., $CO_2$ or $H_2S$) from a gaseous mixture, including an aqueous solution of an amine such as monoethanolamine or diethanolamine, and such an aqueous solution having another acid gas absorption accelerator added thereto.

Among these acid gas absorbents is methyldiethanolamine which was disclosed by F. Vidaurri at the 977th Gas Conditioning Conference, 1900. This methyldiethanolamine is advantageous in that its aqueous solution having absorbed an acid gas can release the acid gas by intermittent exposure to a reduced pressure and can hence save the thermal energy used for the regeneration of the absorbing fluid, and in that it has high acid gas-absorbing power per mole and does not corrode the equipment even if used at high concentrations. On the other hand, it has the disadvantage that its acid gas absorption rate is slow. As disclosed in Japanese Patent Laid-Open No. 198120/'94, it has been confirmed that this disadvantage can be overcome by the addition of a (lower alkyl)piperazine, resulting in a marked improvement in acid gas absorption rate. Thus, an acid gas absorbent containing methyldiethanolamine and a (lower alkyl)piperazine is known as an effective acid gas absorbent which can reduce the size of the absorption system and decrease the amount of absorbent used. Since an acid gas absorbent is being used in the form of an absorbing fluid, it will hereinafter be referred to as an absorbing fluid.

The aforesaid acid gas absorbing fluid containing methyldiethanolamine and a (lower alkyl)piperazine will show a marked increase in industrial utility if, after this absorbing fluid is allowed to absorb an acid gas, it can be regenerated by releasing the acid gas therefrom with little energy consumption and with ease, and can be reused as an absorbing fluid. However, no such method has been known in the prior art.

Consequently, the present inventors carried out various experiments and intensive investigations on the method of regenerating the aforesaid absorbing fluid, and have now completed the present invention.

DISCLOSURE OF THE INVENTION

Accordingly, an object of the present invention is to provide a method wherein an acid gas absorbing fluid containing methyldiethanolamine and a (lower alkyl) piperazine is allowed to absorb an acid gas and, thereafter, the acid gas absorbing fluid is regenerated by releasing the acid gas from the acid gas absorbing fluid effectively at a relatively low temperature.

That is, according to the method of the present invention, an acid gas absorbing fluid containing methyldiethanolamine and a (lower alkyl)piperazine is allowed to absorb an acid gas. Thereafter, the acid gas absorbing fluid can be regenerated by releasing the acid gas from the acid gas absorbing fluid effectively at a relatively low temperature of not less than 40° C. and preferably 40 to 80° C.

In the present invention, the acid gas absorbing fluid which is allowed to absorb an acid gas and subsequently regenerated contains methyldiethanolamine and a (lower alkyl)piperazine.

Specifically, methyldiethanolamine is contained in the aqueous solution as a component having a concentration of 20 to 70% by weight and preferably 40 to 60% by weight.

The (lower alkyl)piperazine is a piperazine derivative having one or two lower alkyl groups of 1 to 4 carbon atoms as a substituent or substituents on the heterocyclic ring. Of such piperazine derivatives, methylpiperazines are preferred. Among others, 2-methylpiperazine and 2,5-dimethylpiperazine are especially preferred. The (lower alkyl)piperazine is contained in the aqueous solution as a component having a concentration of 0.5 to 7.5% by weight and preferably 1.5 to 4.5% by weight.

The gases which can be treated with the acid gas absorbing fluid regenerated according to the present invention include gasified coal gas, synthesis gases, coke oven gas, petroleum gas, natural gas and the like. The gases which can be absorbed thereinto include $CO_2$, $H_2S$ and the like.

As will be described later, the present inventors performed tests in which a simulated exhaust gas prepared by mixing nitrogen gas with $CO_2$ gas in appropriate proportions was passed through a high-pressure $CO_2$ separation and regeneration system having a basic construction illustrated in FIG. 1, so that an acid gas absorbing fluid was allowed to absorb $CO_2$ under the following test conditions and, thereafter, the acid gas absorbing fluid was regenerated by releasing $CO_2$ therefrom.

Gas flow rate: 0.12 $m^3N/h$.

Absorbing fluid flow rate: 4 liters/h.

$CO_2$ partial pressure in absorption tower: 10 ata.

$CO_2$ partial pressure in regeneration tower: 1 ata.

Regeneration tower temperature: 40° C.

Consequently, it has been found that, as shown in FIG. 7, a high regenerative effect as demonstrated by a $CO_2$ recovery of 60% is exhibited even at a relatively low regeneration tower temperature of 40° C. and, moreover, a very high regenerative effect is achieved at higher regeneration tower temperatures as demonstrated by a $CO_2$ recovery of 95% or greater at 60° C. and a $CO_2$ recovery of 99% or greater at 80° C.

BEST MODE FOR CARRYING OUT THE INVENTION

Now, one form of $CO_2$ separation and recovery system in which an acid gas absorbing fluid is allowed to absorb an acid gas and, thereafter, the acid gas absorbing fluid is regenerated in a regeneration tower by releasing the acid gas therefrom according to the present invention is described below with reference to FIG. 1.

Figure 1:
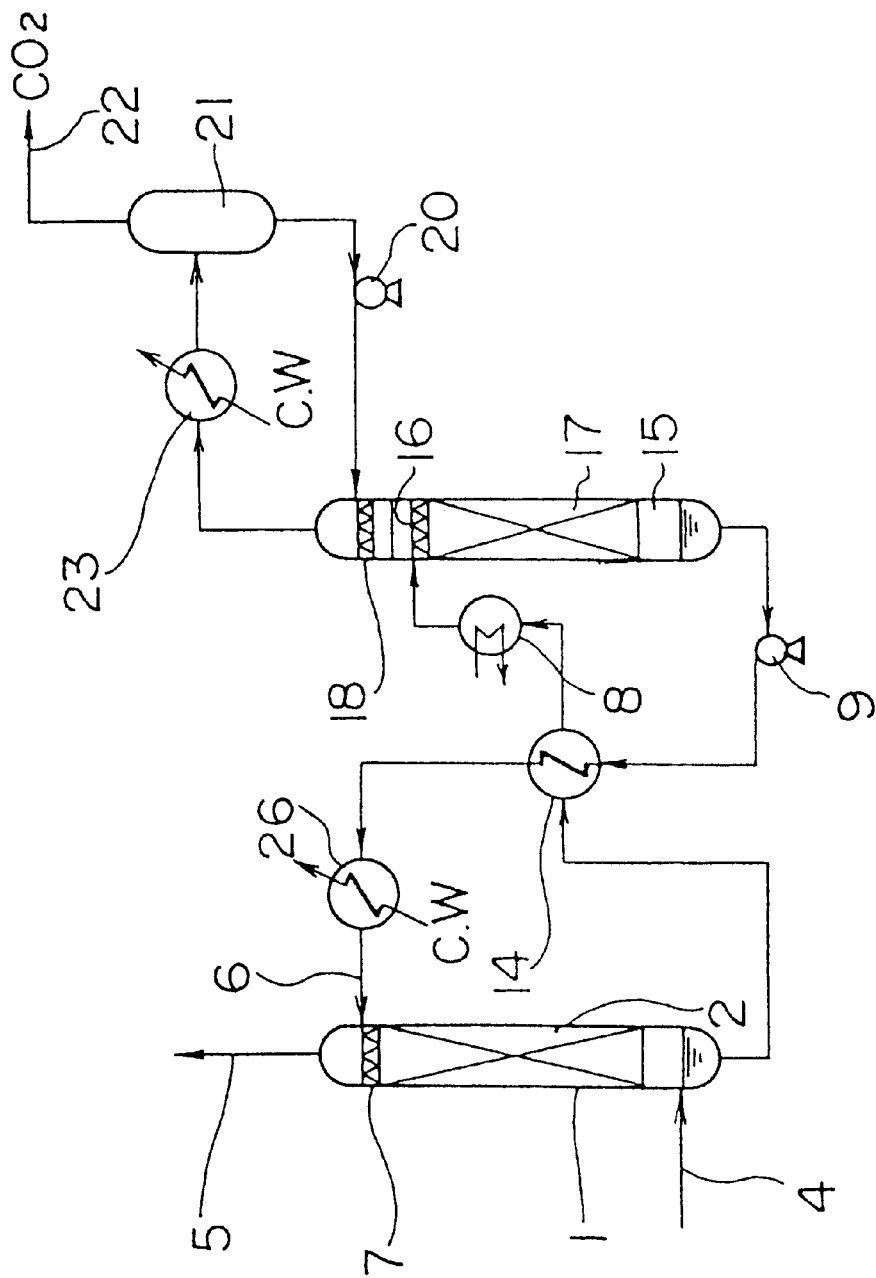
FIG. 1 is a schematic view illustrating one form of $CO_2$ separation and recovery system using an acid gas absorbent having high regenerative power in accordance with the present invention.

In FIG. 1, combustion exhaust gas is introduced into an absorption tower 1 through a $CO_2$-containing gas inlet 4. In its packed region 2, the gas forced into absorption tower 1 is brought into counterflow contact with an absorbing fluid which contains methyldiethanolamine and a (lower alkyl) piperazine at predetermined concentrations and is supplied from a nozzle 7. Thus, the $CO_2$ contained in the gas is removed by absorption into the absorbing fluid, and the resulting gas is discharged through a $CO_2$-free gas outlet 5. The absorbing fluid supplied to absorption tower 1 is allowed to absorbs $CO_2$ therein, passed through a heat exchanger 14, heated in a heater 8, and then introduced into a regeneration tower 15.

In regeneration tower 15, the absorbing fluid flows downward from nozzle 16 through its packed region 17. During this process, $CO_2$ is released from the absorbing fluid to regenerate it. The regenerated absorbing fluid is passed through heat exchanger 14 and a absorbing fluid cooler 26 by means of a pump 9, and returned to absorption tower 1 through an absorbing fluid inlet 6.

In the upper part of regeneration tower 15, the $CO_2$ separated from the absorbing fluid is brought into contact with circulating water supplied from a nozzle 18, and cooled in a regeneration tower reflux condenser 23. Then, in a circulation drum 21, the $CO_2$ is separated from circulating water obtained by the condensation of water vapor entrained by the $CO_2$, and fed to a $CO_2$ recovery step through a recovered $CO_2$ line 22. The circulating water is delivered to regeneration tower 15 by means of a circulating water pump 20.

It is to be understood that this form of system is given for the sole purpose of explaining an outline of the present invention, and some accessory equipment is omitted.

Now, the results of performance tests performed to examine various properties of an acid gas absorbing fluid to be regenerated according to the present invention are described below.

As the acid gas absorbing fluid to be regenerated according to the present invention, an aqueous solution containing 45% by weight of methyldiethanolamine and 3% by weight of 2-methylpiperazine was prepared. Moreover, as a comparative example in these performance tests, an aqueous solution containing 45% by weight of methyldiethanolamine and 3% by weight of piperazine was prepared. This absorbing fluid (or absorbent) was employed as a comparative example because it is recently used for the purpose of absorbing $CO_2$ from exhaust gas under pressure.

The results of various performance tests on the absorbing fluid to be regenerated according to the present invention and the absorbing fluid used as a comparative example are shown below.

Corrosiveness of Each Absorbing Fluid

The corrosiveness of each absorbing fluid was examined. A specimen measuring 30.0 mm×19.9 mm×3.0 mm and having φ3.0 mm holes was made of SS41 (carbon steel), placed in each absorbing fluid under a $CO_2$ pressure of 0.8 atm., and held at 60° C. for 94 hours. The results thus obtained are shown in

TABLE 1

| Absorbing fluid | Degree of corrosion (mm/y) |
|---|---|
| MDEA + MP | 0.42 |
| MDEA + P | 0.42 |

It can be seen from the results shown in Table 1 that, with respect to corrosiveness, the absorbing fluid to be regenerated according to the present invention bears comparison with the conventionally used (MDEA+P) absorbing fluid.

Vapor Pressure of Each Absorbing Fluid

Figure 2:
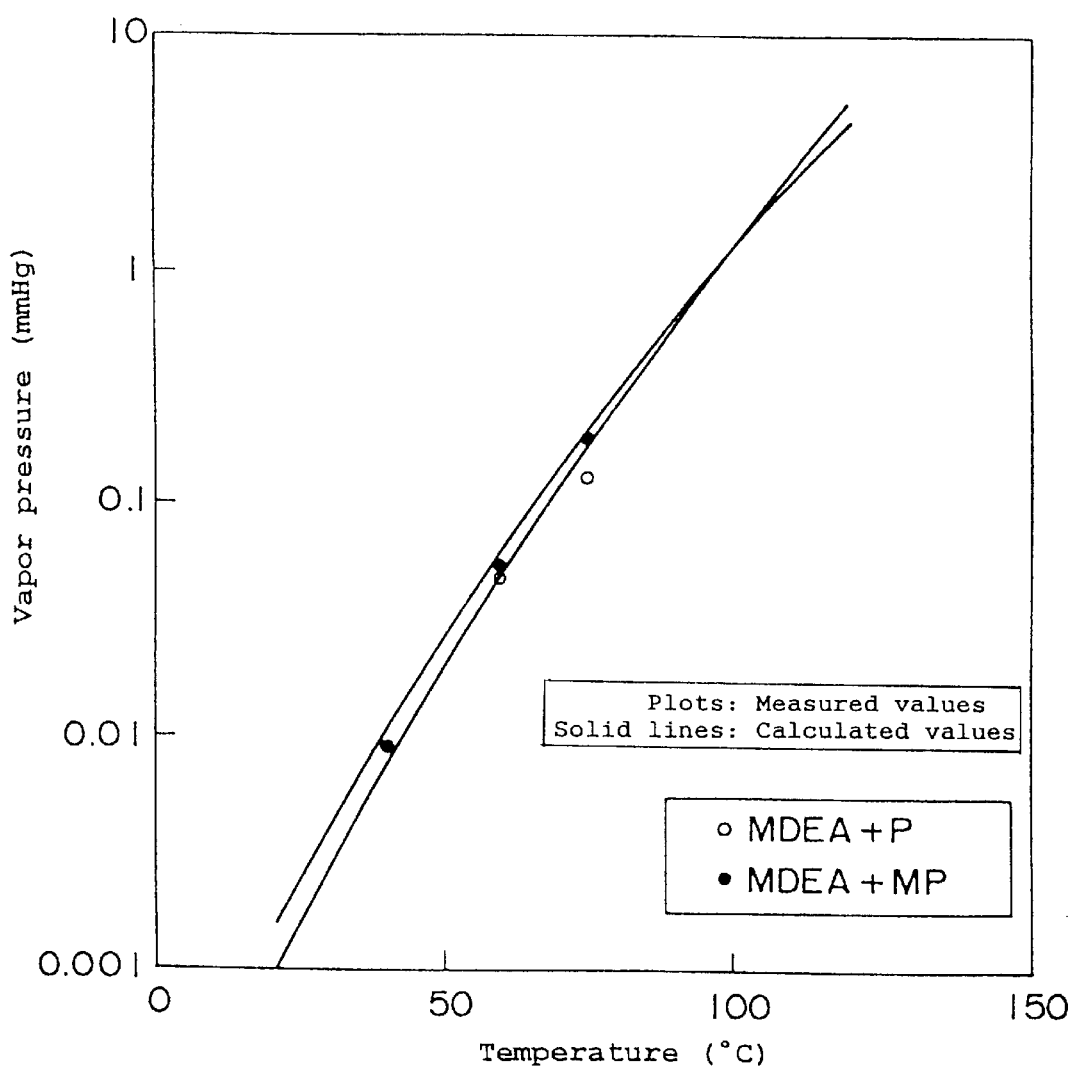
FIG. 2 is a graph showing changes of vapor pressure with the temperature of absorbing fluids.

Changes of vapor pressure with the temperature of each absorbing fluid were examined. The results thus obtained are shown in FIG. 2. There is no substantial difference between the conventionally used (MDEA+P) absorbing fluid and the absorbing fluid in accordance with the present invention.

Relationship between $CO_2$ Partial Pressure and Solubility

Figure 3:
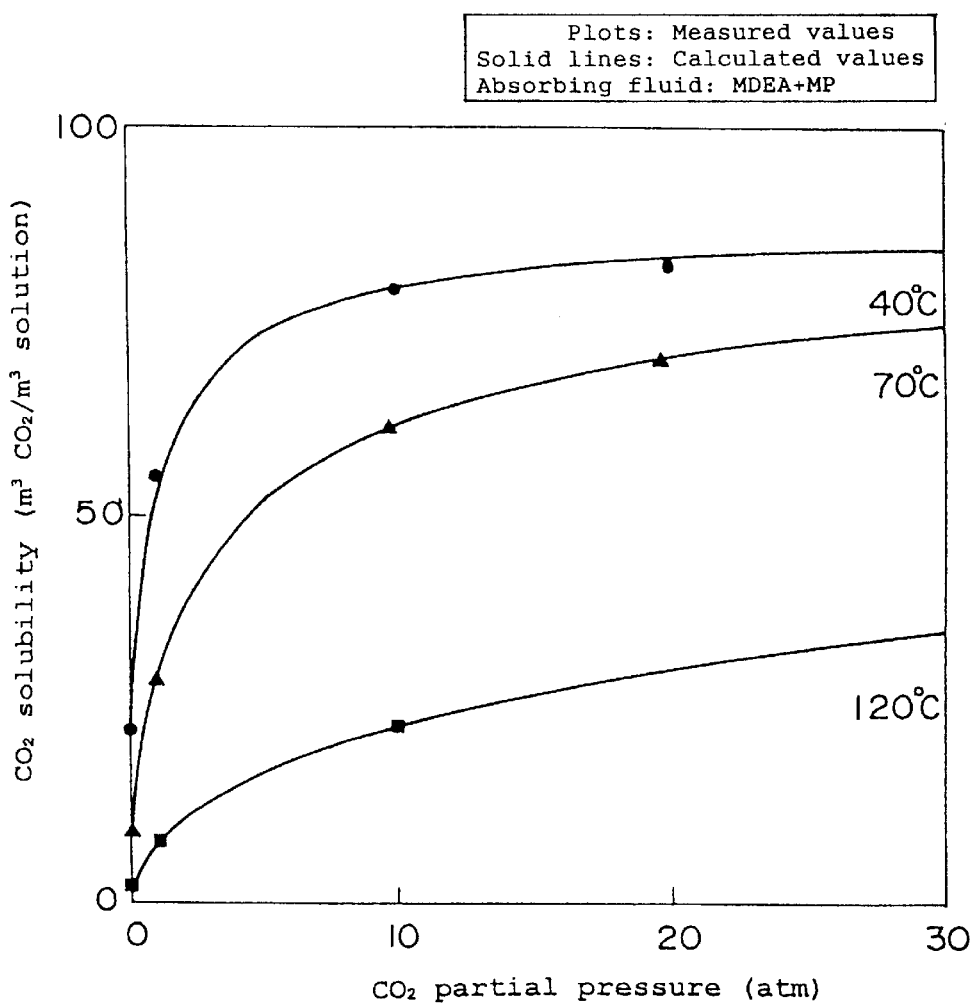
FIG. 3 is a graph showing the relationship between $CO_2$ partial pressure and solubility for a (MDEA+MP) absorbing fluid in accordance with the present invention.
Figure 4:
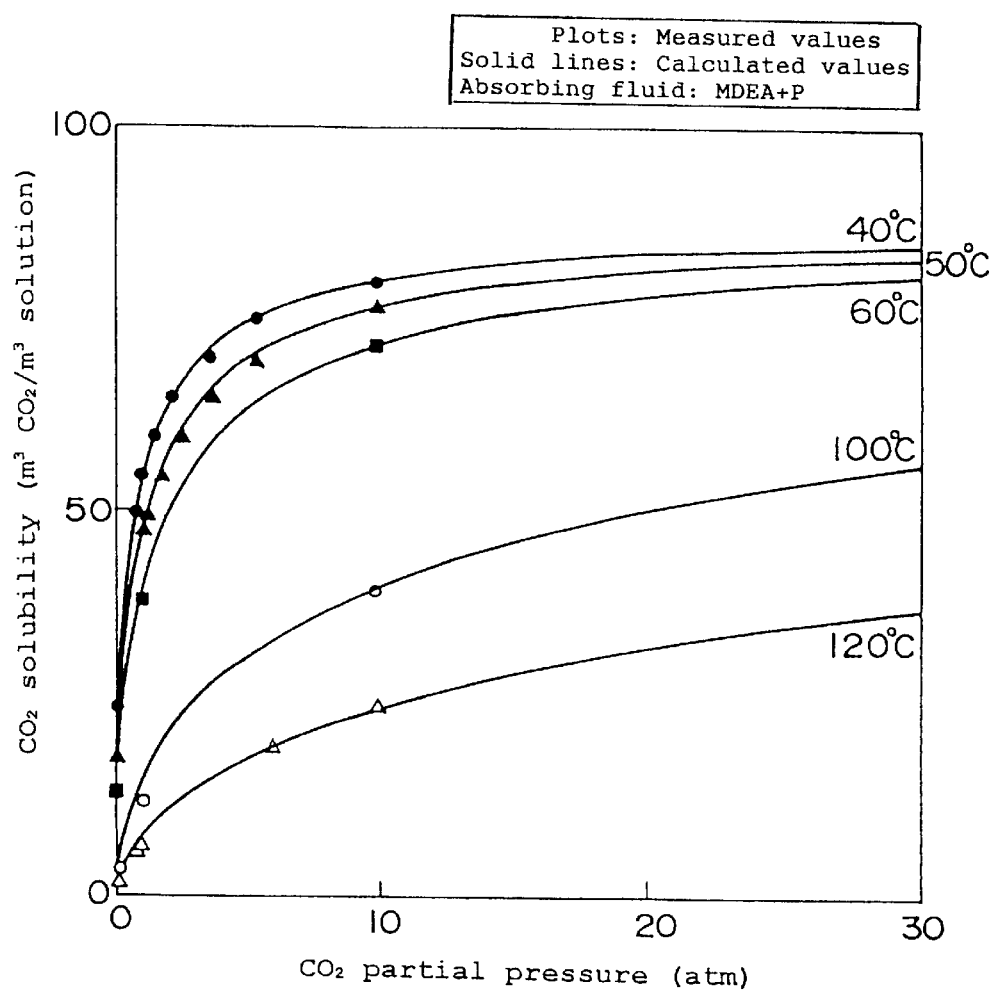
FIG. 4 is a graph showing the relationship between $CO_2$ partial pressure and solubility for a (MDEA+P) absorbing fluid used as a comparative example.

The relationship between the $CO_2$ partial pressure and solubility of each absorbing fluid was examined by varying the temperature. The results obtained with the absorbing fluid to be regenerated according to the present invention are shown in FIG. 3, and the results obtained with the comparative example are shown in FIG. 4. Both absorbing fluids are also equivalent in this property.

Figure 5:
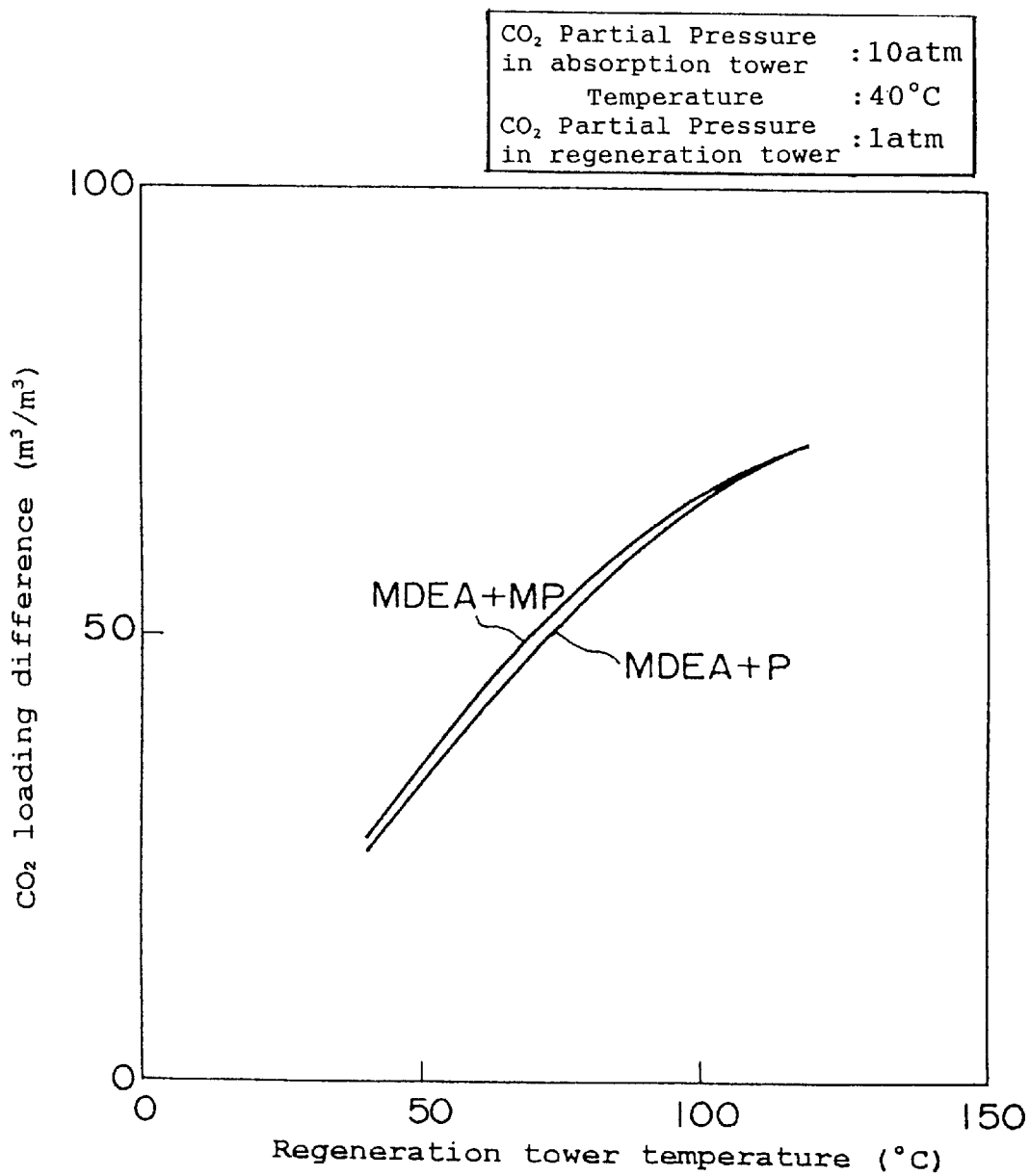
FIG. 5 is a graph showing the relationship between the regeneration tower temperature and the $CO_2$ loading difference.

Relationship between Regeneration Tower Temperature and $CO_2$ Loading Difference By varying the temperature of the regeneration tower, the relationship between the regeneration tower temperature and the $CO_2$ loading difference was examined with respect to each absorbing fluid. The term "loading difference" refers to the difference between the amount of $CO_2$ contained in the absorbing fluid at the outlet of the $CO_2$ absorption tower and the amount of $CO_2$ contained in the absorbing fluid regenerated by separating $CO_2$ therefrom in the regeneration tower. The relationship between the regeneration tower temperature and the $CO_2$ loading difference is shown in FIG. 5. As shown in FIGS. 2, 3, 4 and 5, both absorbing fluids are also equivalent in this physical property.

Next, a basic $CO_2$ absorption test was performed in order to confirm that, when used as an acid gas absorbing fluid, the absorbing fluid to be regenerated according to the present invention has higher $CO_2$-absorbing power than the conventionally used acid gas absorbing fluid.

Test for $CO_2$ Absorption Rate

With respect to the $CO_2$-absorbing power, the relationship between the $CO_2$ absorption time and the $CO_2$ concentration in the absorbing fluid was examined.

In this test, a test apparatus for the measurement of gas-liquid equilibrium was used. Each absorbing fluid was placed in an absorbing fluid vessel, and $CO_2$ was supplied in such a way that a total pressure of 10 ata. was maintained. Samples of the fluid were taken periodically and analyzed to determine the amount of $CO_2$ dissolved in the fluid and thereby evaluate the $CO_2$ dissolution rate of the absorbing fluid. The temperature of the absorbing fluid vessel was maintained at 40° C. Moreover, a gas consisting entirely of $CO_2$ was supplied at a feed rate of 0.92 liter N/min. During the reaction, the absorbing fluid vessel was stirred at 300 rpm and the amount of absorbing fluid charged was 625 g.

Figure 6:
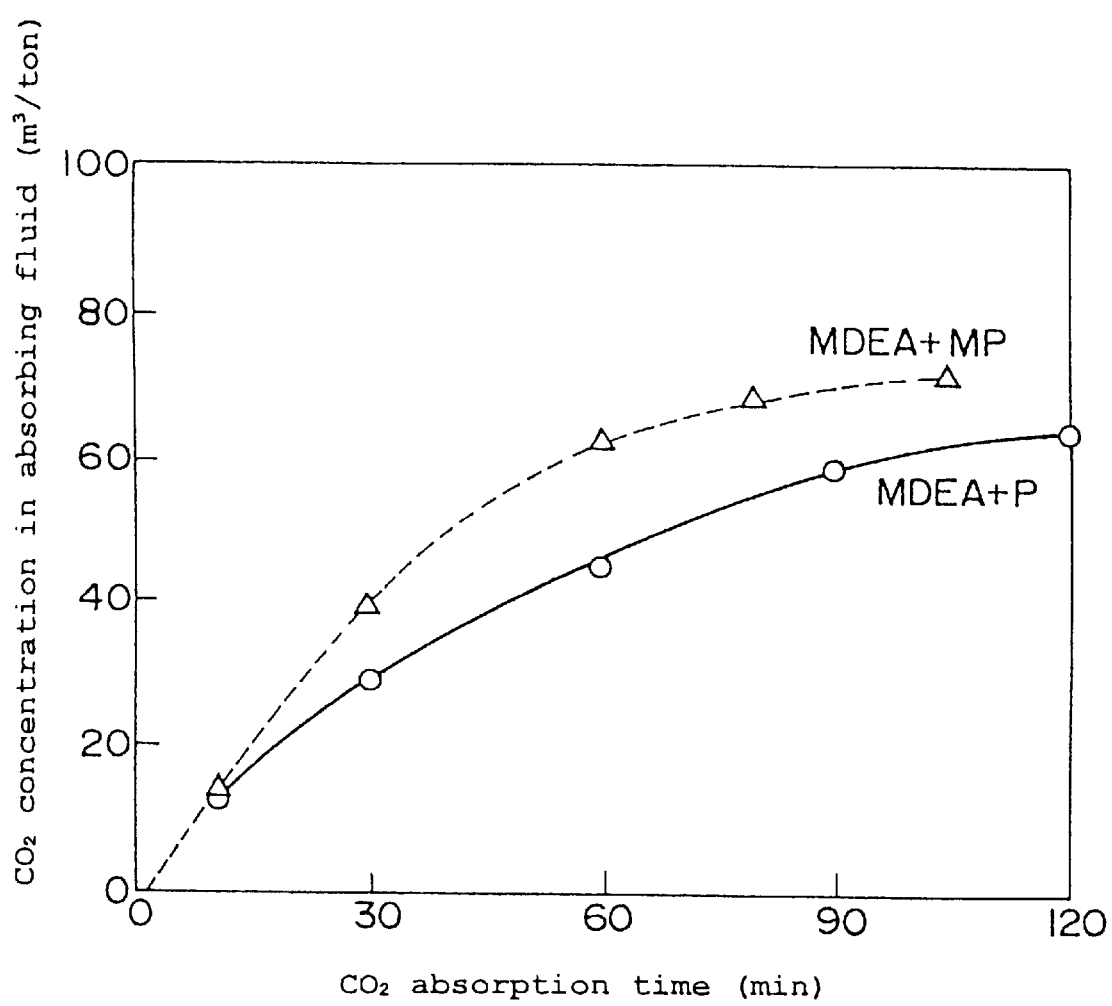
FIG. 6 is a graph showing the relationship between the $CO_2$ absorption time and the $CO_2$ concentration in the absorbing fluid.

The results thus obtained are shown in FIG. 6. It can be seen from this figure that the (MDEA+MP) absorbing fluid in accordance with the present invention is more excellent in absorption rate.

As described above, it can be seen that, when compared with the conventionally used absorbing fluid, the acid gas absorbing fluid to be regenerated according to the present invention is equivalent in basic properties and more excellent in $CO_2$ absorption rate.

Next, $CO_2$ absorption and regeneration tests were performed in order to confirm that this acid gas absorbing fluid having excellent properties can be effectively used in the absorption of $CO_2$ and in the method for the regeneration of an acid gas absorbing fluid.

$CO_2$ Absorption and Regeneration Tests

In these tests, a high-pressure $CO_2$ separation and regeneration test system having a basic construction almost similar to that illustrated in FIG. 1 was provided. A simulated exhaust gas was prepared by mixing nitrogen gas supplied from a nitrogen gas cylinder with $CO_2$ gas supplied from a carbon dioxide cylinder in appropriate proportions, and the properties of the gas were properly controlled so as to conform to experimental conditions. Moreover, a gas meter was installed in the discharge line. Furthermore, a thermostatic means for regulating the temperatures of the refrigeration tower and the absorption tower was also provided.

In the $CO_2$ absorption and regeneration tests, the relationship between the regeneration tower temperature and the $CO_2$ recovery was examined in order to confirm that the regeneration method of the present invention can effectively regenerate an acid gas absorbing fluid even at a relatively low temperature. The test conditions were as follows.

Gas flow rate: 0.12 $m^3N/h$.

Absorbing fluid flow rate: 4 liters/h.

$CO_2$ partial pressure in absorption tower: 10 ata.

$CO_2$ partial pressure in regeneration tower: 1 ata.

Regeneration tower temperature: 40° C.

Figure 7:
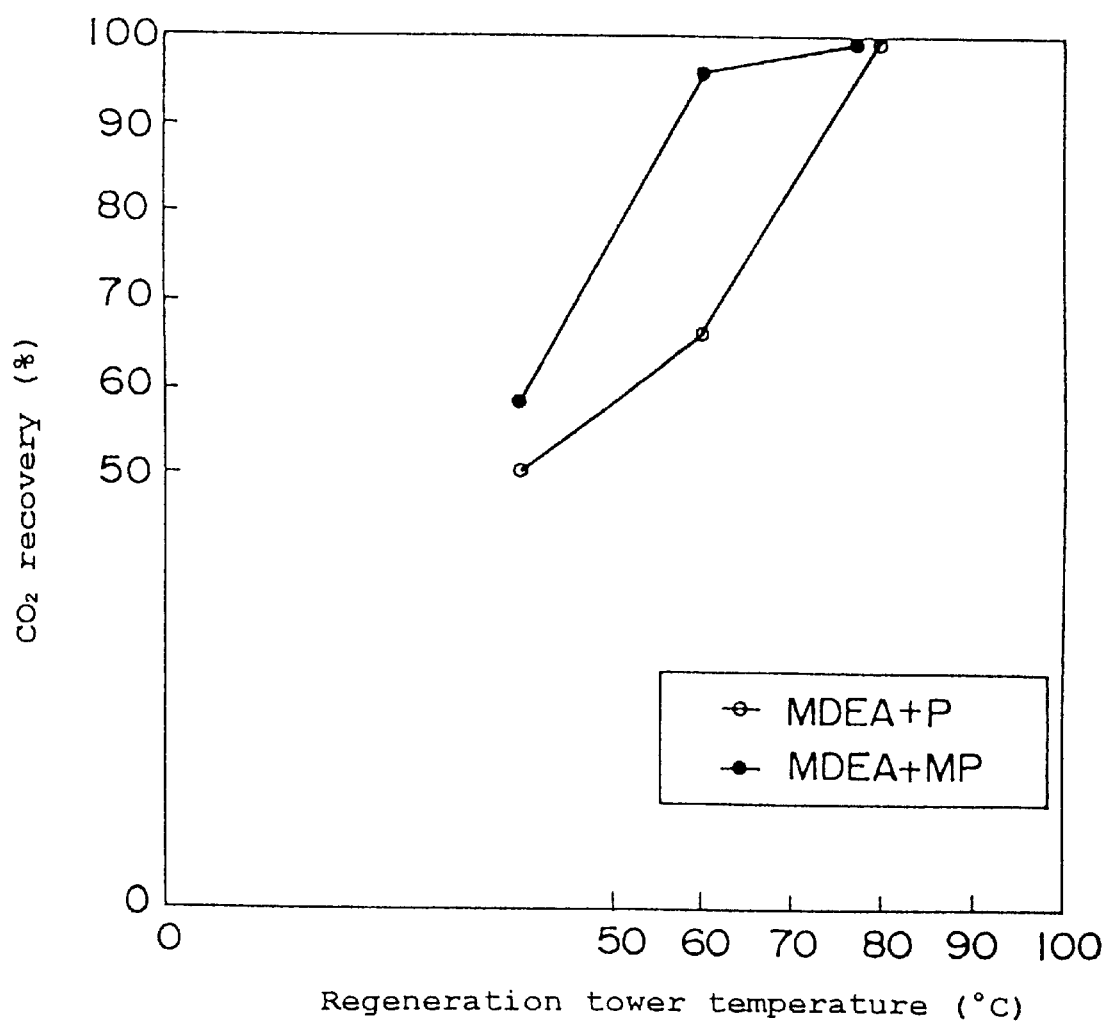
FIG. 7 is a graph showing the relationship between the regeneration tower temperature and the $CO_2$ recovery.

The results thus obtained are shown in FIG. 7. According to the regeneration method of the present invention, the (MDEA+MP) absorbing fluid exhibits a $CO_2$ recovery of as high as 60% when the temperature of the regeneration tower is 40° C. Moreover, the $CO_2$ recovery exceeds 95% at a regeneration temperature of 60° C. or above, and reaches 99% at 80° C. Thus, it can be confirmed that the method for the regeneration of an acid gas absorbing fluid in accordance with the present invention uses the absorbing fluid effectively. Moreover, it can also be confirmed by FIG. 7 that the (MDEA+MP) absorbing fluid has much more excellent absorbing power and regenerative power than the (MDEA+P) absorbing fluid.

Figure 8:
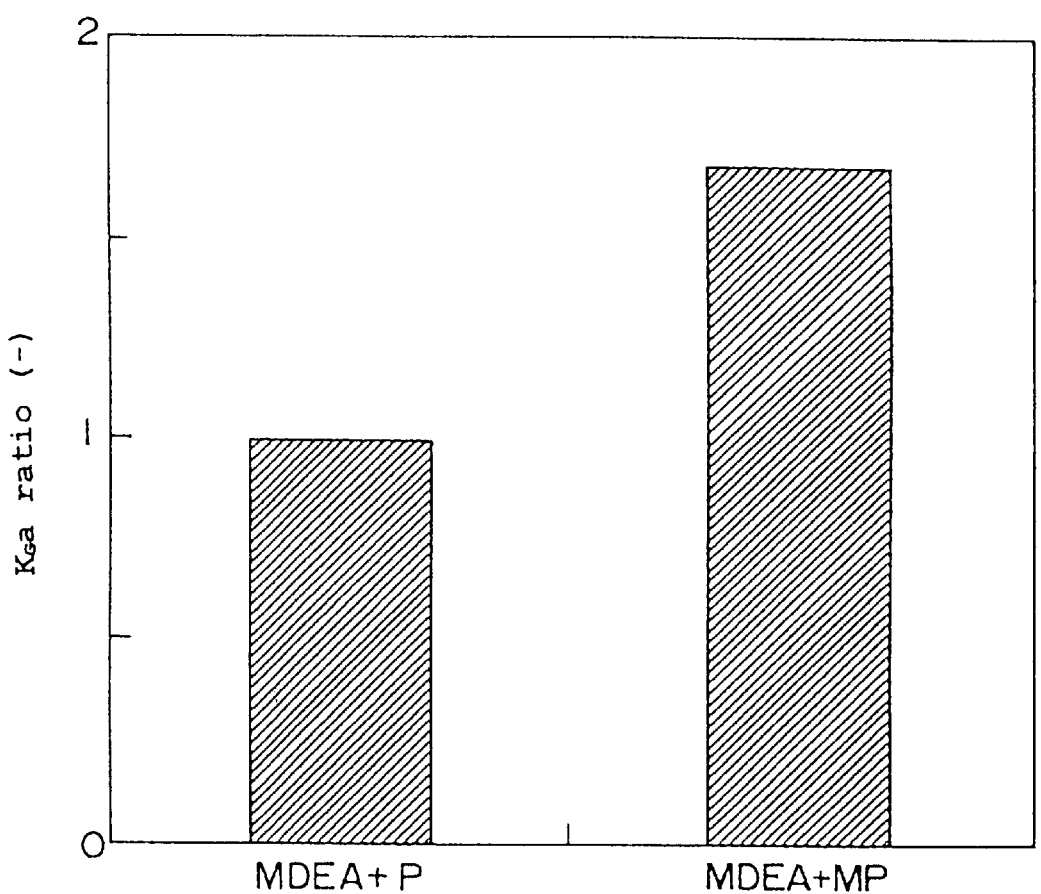
FIG. 8 is a graph showing gas-based overall capacity coefficient ($K_G a$) ratios.

In the $CO_2$ absorption and regeneration tests, the gas-based overall capacity coefficient ($K_Ga$) ratio was also examined. This $K_Ga$ ratio serves as an index to absorbing power. The results thus obtained are shown in FIG. 8. The test conditions were the same as those employed in the test for examining the relationship between the regeneration tower temperature and the $CO_2$ recovery, except that the regeneration tower temperature was fixed at 40° C. Thus, it can be confirmed that the (MDEA+MP) absorbing fluid in accordance with the present invention shows an improvement of about 70% over the (MDEA+P) absorbing fluid.

Figure 9:
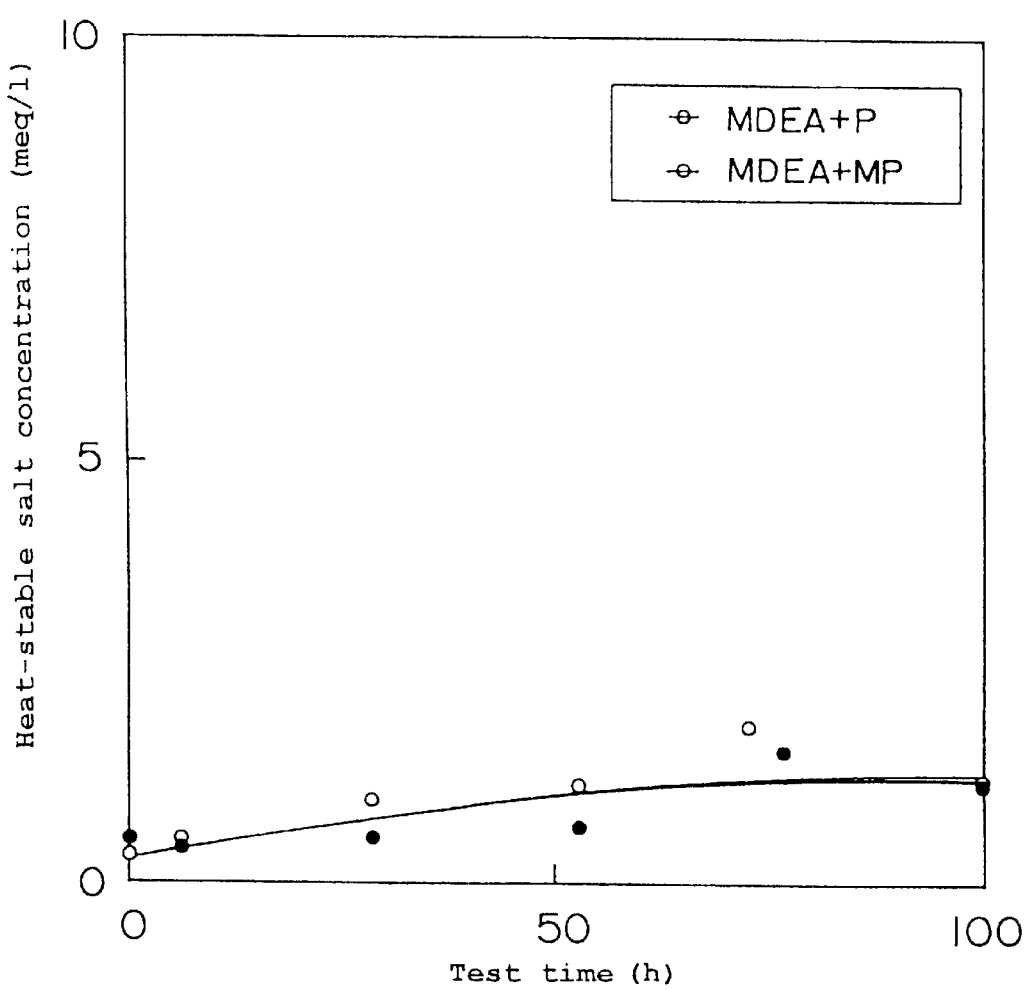
FIG. 9 is a graph showing changes of the heat-stable salt concentration in the absorbing fluid with time.

Next, changes of heat-stable salt concentration with time were examined in order to confirm that the absorbing fluid regenerated according to the present invention can retain stabilized properties during the repeated absorption and release of $CO_2$ over a long period of time. This test provides an index to the deterioration of the absorbing fluid. The results thus obtained are shown in FIG. 9. The test conditions were the same as those employed in the test for examining the relationship between the regeneration tower temperature and the $CO_2$ recovery, except that the regeneration tower temperature was fixed at 60° C. Thus, it has been found that the (MDEA+MP) absorbing fluid in accordance with the present invention is equivalent to the (MDEA+P) absorbing fluid.

When the above-described test results are put together, it can be seen that the method for the regeneration of an acid gas absorbent in accordance with the present invention can effectively regenerate an acid gas absorbent containing methyldiethanolamine and a (lower alkyl)piperazine even at a relatively low temperature of 40° C. and can regenerate it much more effectively at a temperature of 60° C. or above.

What is claimed is:

1. A method for the regeneration of an acid gas absorbing fluid which comprises bringing a gaseous mixture containing an acid gas into contact with an absorbing fluid containing methyldiethanolamine and a (lower alkyl)piperazine so as to absorb the acid gas into the absorbing fluid, and regenerating the absorbing fluid by releasing the acid gas from the absorbing fluid in a regeneration tower having a temperature of 40° C. to 80° C.

2. The method according to claim 1, wherein the (lower alkyl)piperazine is present in a concentration ranging from 0.5 to 7.5 percent by weight.

3. The method according to claim 1, wherein the methyldiethanolamine is present in a concentration ranging from 20 to 70 percent by weight.

* * * * *

UNITED STATES PATENT AND TRADEMARK OFFICE
CERTIFICATE OF CORRECTION

PATENT NO.    : 6,423,282 B1
DATED         : July 23, 2002
INVENTOR(S)   : Araki et al.

It is certified that error appears in the above-identified patent and that said Letters Patent is hereby corrected as shown below:

<u>Column 4,</u>
Line 7, should read -- obtained are shown in Table 1. --

Signed and Sealed this

Ninth Day of December, 2003

JAMES E. ROGAN
*Director of the United States Patent and Trademark Office*